(12) United States Patent
Oftedal

(10) Patent No.: US 10,870,149 B2
(45) Date of Patent: Dec. 22, 2020

(54) MATERIAL MELTING DEVICE

(71) Applicant: Marna Engineering AS, Mandal (NO)

(72) Inventor: Daniel Oftedal, Mandal (NO)

(73) Assignee: Marna Engineering AS, MAndal (NO)

( * ) Notice: Subject to any disclaimer, the term of this patent is extended or adjusted under 35 U.S.C. 154(b) by 26 days.

(21) Appl. No.: 16/300,591

(22) PCT Filed: May 12, 2017

(86) PCT No.: PCT/IB2017/052799
§ 371 (c)(1),
(2) Date: Nov. 12, 2018

(87) PCT Pub. No.: WO2017/195159
PCT Pub. Date: Nov. 16, 2017

(65) Prior Publication Data
US 2019/0201978 A1    Jul. 4, 2019

(30) Foreign Application Priority Data

May 13, 2016 (NO) .................................. 20160823

(51) Int. Cl.
*B33Y 30/00* (2015.01)
*B22F 3/00* (2006.01)
(Continued)

(52) U.S. Cl.
CPC .............. *B22F 3/008* (2013.01); *B29C 48/02* (2019.02); *B29C 48/05* (2019.02); *B29C 48/266* (2019.02); *B29C 48/797* (2019.02); *B29C 48/83* (2019.02); *B29C 48/865* (2019.02); *B29C 64/106* (2017.08); *B33Y 30/00* (2014.12); *C03B 19/01* (2013.01); *B29C 64/209* (2017.08); *B33Y 10/00* (2014.12)

(58) Field of Classification Search
CPC ................................ B33Y 10/00; B33Y 30/00
See application file for complete search history.

(56) References Cited

U.S. PATENT DOCUMENTS

2003/0168498 A1   9/2003  Suter et al.
2012/0161350 A1   6/2012  Swanson
(Continued)

FOREIGN PATENT DOCUMENTS

CN      204936223 A    1/2016
EP        0225943      6/1987
(Continued)

*Primary Examiner* — Scott R Kastler
(74) *Attorney, Agent, or Firm* — Christian D. Abel

(57) ABSTRACT

A material melting device (10) for melting a work material, and discharge of the melted work material, is described. The material melting device (10) comprises a cold part (12) and a hot part (30), and a work material duct (22) for supplying said work material. The work material duct (22) extends at least partially through the cold part (12) to a melting chamber (33) arranged in the hot part (30). The hot part (30) comprises a nozzle duct (34) extending from the melting chamber (33) to a nozzle opening (35) such that melted work material can be flowed from the melting chamber (33) and discharged from the nozzle opening (35). The melting chamber (33) has a cross-sectional area which is larger than the cross-sectional area of the work material duct (22).

17 Claims, 9 Drawing Sheets

(51) Int. Cl.
| | |
|---|---|
| *B29C 64/106* | (2017.01) |
| *B29C 48/25* | (2019.01) |
| *B29C 48/05* | (2019.01) |
| *B29C 48/80* | (2019.01) |
| *B29C 48/86* | (2019.01) |
| *B29C 48/02* | (2019.01) |
| *B29C 48/797* | (2019.01) |
| *C03B 19/01* | (2006.01) |
| *B33Y 10/00* | (2015.01) |
| *B29C 64/209* | (2017.01) |

(56) References Cited

U.S. PATENT DOCUMENTS

| | | | |
|---|---|---|---|
| 2013/0287934 A1 | 10/2013 | Ramsundar | |
| 2015/0008249 A1 | 1/2015 | Stroemberg | |
| 2015/0108677 A1* | 4/2015 | Mark | ............... B29C 70/20 |
| | | | 264/138 |

FOREIGN PATENT DOCUMENTS

| | | |
|---|---|---|
| WO | WO 2015/009938 A | 1/2015 |
| WO | WO 2016/011252 A | 1/2016 |

* cited by examiner

Fig. 6a
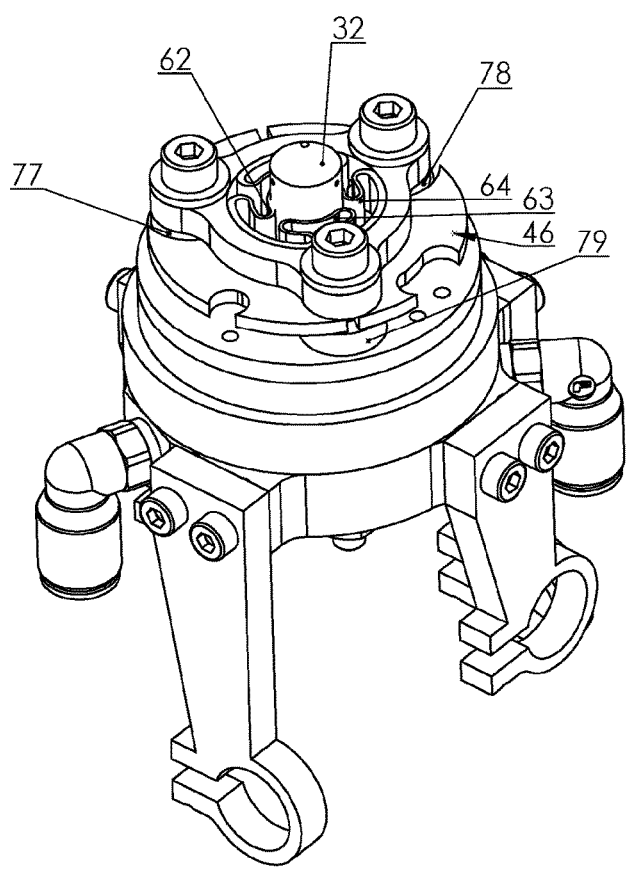
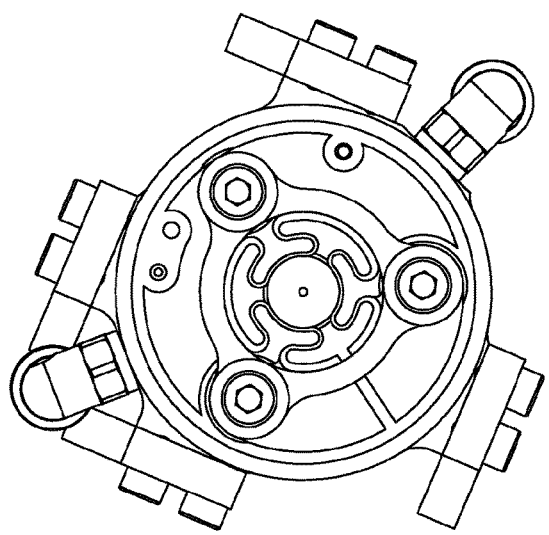
Fig. 6b

MATERIAL MELTING DEVICE

The present invention relates to a material melting device, specifically a high temperature material melting device, for melting a material and discharge of the melted material. The material melting device may for instance be used in a FFF-printer, or a FFF-like device, where a material is used to build a three-dimensional object. Further, the material melting device can be used in soldering devices for melting soldering material, or in a welding apparatus for melting the material deposited onto the seam weld. In a corresponding way, the material melting device can also be used in a device for melting glass.

In 3D printing, Fused Filament Fabrication (FFF), is a process for producing a three-dimensional object, wherein the object is constructed layer by layer with a material deposited onto the part of the object already constructed. A new layer of material deposited onto the existing part of the object has such a high temperature that the outer layer of the existing part of the object melts together with the newly deposited layer. In this way, the object is constructed layer by layer until the object is completed.

Existing 3D printers for metal are extremely expensive, and usually use metal powder and laser and sintering methods to form the three-dimensional object. This is burdened with a safety risk, both regarding the metal powder and the lasers used.

For several years, three-dimensional printing with plastic has been available in the market. In about 1990, the US firm Stratasys developed and patented the FFF-method. The patent is now expired, and today several suppliers in the market offers 3D printers for printing three-dimensional models in plastic. 3D printers for the hobby market are now available commercially to affordable prices.

The difference between for instance a metal and plastic is that the plastic does not melt into a liquid state. ABS plastic, which is a commonly used material in today's printers, is amorphous, and has no real melting temperature. In the printer, the ABS plastic is heated to about 230 degrees, such that it becomes soft, and is then extruded and deposited onto the model being built, and is then bound to the outer layer of the model onto which layer the extruded plastic is deposited.

Currently, for 3D printing with metal, completely different and considerably more expensive methods are required. A well-known method is for example laser sintering, by which a metal in powder form are used, which is deposited onto a base layer and heated locally by a laser such that the powdery metal is sintered into the base layer. This equipment cost in the magnitude of several hundred thousand US dollars, and is intended for the professional market.

Thus, an objective of the present invention has been to achieve metal printing using affordable FFF-like equipment, such that production and sale of printers at reasonable prices is possible. So far, this has not been possible to achieve, because of the presence of several seemingly insurmountable obstacles.

The main challenge with printing in metal with the FFF-method is that the metal wire to be deposited onto the model being built often get stuck, and thus, the printing halts. Another problem, and a safety risk, is that undesired leakage of melted metal may occur. Most metals have high melting temperatures, and a leakage of melted metal will lead to destruction of equipment and the surroundings, and constitute a large fire hazard.

As mentioned above, the difference between heating metal and plastic is that the plastic is amorphous and has no real melting temperature. Inside the printer, the plastic is heated to about 230 degrees, wherein it becomes soft, and is extruded and is attached to and fused into the plastic base layer.

However, metal turns completely liquid when melted. The heat energy in the metal applied during the printing is high enough to heat the previously deposited metal layer to be melted into the new layer.

Among the most common metals which may provide strong and cheap end products in 3D printing, aluminum has the lowest melting temperature of 660° C. However, this temperature is much higher than the temperatures involved in extruding plastic, and compared to plastic printers, this concerns several challenges in the design of 3D printers. For instance, in the development of the present invention, it has been found that it is necessary to take into consideration the following issues which may cause problems:

Choice of material for the different parts of the printer, and thermal expansion of different parts in the printer at the high temperatures necessary under operation to melt the metal;
Mechanically induced and temperature induced wear;
Parts of the printer may be dissolved by the liquid metal;
Leakage of melted metal, and;
Clogging/blockage of metal inside the printer.

Consequently, the object of the present invention has been to provide a 3D printer for printing/building three-dimensional objects of metal, preferably using the FFF-method.

Specifically, it has been an object to provide 3D printers for printing three-dimensional objects of metal, preferably using the FFF-method, wherein the problems mentioned above has been solved.

It has also been an object to be able to use the invention for other purposes in which a material shall be melted and deposited onto a base layer, an object or the like, and, preferably, melted into/together with this. For example, this concerns soldering, in which a soldering material, often in the form of a wire, is melted and applied to a base layer. The same is true for welding, wherein a material is melted and deposited into a welding seam or the like. Also, in the melting and application of glass onto an object, it has been a goal to use the same equipment.

These goals are achieved with a material melting device as defined in independent claim 1, and use of the material melting device as defined in claims 19, 21, 22 and 23. Further embodiments of the invention are defined in the dependent claims 2-18 and 20.

Thus, there is provided a material melting device for melting a work material and discharging the melted work material. The material melting device comprises a cold part and a hot part, and a work material duct for supplying said work material, wherein the work material duct extends through, or at least partially through, the cold part and to a melting chamber which is arranged in the hot part. Further, the hot part comprises a nozzle duct extending from the melting chamber to a nozzle opening, such that melted work material can be flowed from the melting chamber and discharged from the nozzle opening. The melting chamber further has a cross-sectional area which is larger than the cross-sectional area of the work material duct.

The cross-sectional area of the melting chamber is at least so much larger than the cross-sectional area of the work material duct that melted work material in the melting chamber can flow up and around unmelted work material which is being fed into the melting chamber. This contributes to improved heat transfer to the unmelted work material and makes melting of work material in the melting chamber considerably more efficient and is therefore very advantageous. The cross-sectional area of the melting chamber is therefore preferably at least 1.2 times larger than the cross-sectional area of the work material duct, and more preferably at least 1.5 times larger than the cross-sectional area of the work material duct.

Preferably, the hot part comprises a head part, wherein the melting chamber and the nozzle duct are arranged in the head part, and the head part is heated with a heating element. The head part is preferably made from boron nitride, which is not electrically conducting, and which at the same time has a heat conducting ability which makes heat able to be transported from the heating element and through the head element such that the work material inside the melting chamber can be melted. The head element will typically have a temperature of 850° C. in operation, if the work material is aluminum.

Other suitable materials can of course also be used in the head part. The head part may for instance be completely or partially made from graphite or a ceramic material. This material also has good thermally conducting properties; i.e., high heat conducting ability, such that heat from a heating element effectively is conducted to the melting chamber, in which the work material supplied to the melting chamber is melted before being discharged and deposited onto a desired area. By making the melting chamber larger in a direction transverse to the longitudinal direction of the work material duct, i.e., in the direction of movement of the work material when the material melting device is moving, melted metal will be able to float up adjacent to the work material, i.e., normally a work material wire, which is not melted. This will provide faster melting of the work material supplied into the melting chamber.

As mentioned, the melting chamber is arranged in the hot part of the material melting device. The melting chamber may be arranged in the interior of the head part; preferably, the melting chamber is arranged in a lateral section of the head part such that the inlet of the melting chamber is arranged in or very close to a surface on the head part facing the cold part. As mentioned above, the cross sections of the work material duct and the inlet of the melting chamber are preferably correspondingly formed. Consequently, the work material, more or less directly, moves from a sealing element in the cold part and into the melting chamber. The melting chamber may have a constant cross-sectional shape over its entire length, or may alternatively have a varying cross-sectional shape, if desired, for instance because of production technical and/or production economic reasons.

Normally, the work material duct will have a circular or approximately circular cross section, and then the diameter of the melting chamber will be larger than the diameter of the work material duct; i.e., the melting chamber has a cross-sectional area which is larger than the cross-sectional area of the work material duct.

Of course, other shapes of the cross section of the work material duct may be used; for example, square, rectangular, or elliptic shapes, with the proviso that the cross-sectional area of the melting chamber is larger than the cross-sectional area of the work material duct.

Thus, for different lengths of the work material duct and the melting chamber, the melting chamber has a larger volume than the work material duct. If the melting chamber has a variable cross-sectional area, the average cross-sectional area or average diameter of the melting chamber will be larger than the cross-sectional area or diameter of the work material duct such that it is enough space for melted work material to float up adjacent to work material supplied into the melting chamber, and which is not yet melted. The advantages here are that the heat transfer to the work material becomes efficient, and that because the work material moves through liquid material, the work material friction against areas in which it is melted, i.e., the melting chamber, is reduced to a very low value, in practice the friction will be approximately zero, and, consequently, the problem of the work material constantly getting stuck is avoided.

Preferably, the material melting device is a high-temperature material melting device for melting the work material, and discharge of the melted work material, wherein said work material has a high melting temperature. The term "high-temperature" here means a temperature of 500° C. or higher; consequently, the material melting device must withstand at least this temperature in operation.

Typically, the diameter of the nozzle opening may be about 0.4 mm if the work material is aluminum. If faster printing is desired, i.e., discharging melted work material from the nozzle opening faster, with lower resolution on the object being produced, or slower, with higher resolution on the object being produced, the diameter of the nozzle duct and/or the nozzle opening can be changed by substituting the head element. Alternatively, the head part may be formed with an exchangeable nozzle element.

Thus, the material melting device is formed with a cold upper part, which is cooled with a cooling fluid such as for instance water, and, a hot lower part, which preferably, but not necessarily, is electrically heated. It is important that the hot part and the cold part are thermally isolated from each other as much as possible. If necessary, for instance when aluminum is used as work material, the printing is performed, i.e., the discharging of the melted work material, in a closed chamber with supplied argon gas and water cooling. Alternatively, 90% of the air in the working chamber may be removed, for example using a vacuum pump, such that the need for argon supply is less. The working duct in the cold part preferably empties into the melting chamber of the hot part. Normally, the work material duct and the inlet of the melting chamber will basically have the same cross section, i.e., the cross-sectional shape and the cross-sectional area of the working duct and the inlet of the melting chamber are similar. Normally, this means they have basically the same diameter. Moreover, it is possible to provide the melting chamber with a cross section of the inlet which is larger than the cross section of the work material duct; i.e., if the work material duct and the melting chamber have more or less circular cross sections, then the melting chamber has a somewhat larger diameter then the work material duct.

The material melting device can be incorporated into the different types of devices, wherein there is a need to melt a work material and deliver a measured amount of liquid work material to a carefully controlled area. The work material is fed into the material melting device in solid form, preferably in the form of a continuous metal wire, or, alternatively, in the form of pieces or pellets of desired sizes. In the material melting device, the work material is melted in a melting chamber, and is discharged through a nozzle duct, and is deposited onto a desired area. If aluminum is used as work material, the aluminum wire can typically have a diameter in the order of 1 mm; however, the diameter may of course be larger or smaller depending on the purpose of the material melting device, and depending on which material the work material is. The aluminum wire may be purchased on a coil, in the same way as plastic thread for plastic printers. The aluminum wire can be fed into the extruder using a feeding device in a common manner, e.g., with a conventional stepper motor.

Preferably, the hot part comprises a head part, wherein the melting chamber and nozzle duct are arranged in the head part, and wherein the head part is heated by the heating element. Preferably, the head part is made from boron nitride, which is not electrically conducting, and at the same time it has a heat conducting ability which makes it possible to transport heat from the heating element through the head element, such that work material in the melting chamber can be melted. Typically, the head element will be at a temperature of about 850° C. in operation if the work material is aluminum.

Of course, other suitable materials may also be used in the head part. The head part may for example be completely, or partially, made from graphite, or a ceramic material. This material also has good thermal conductive properties, i.e., high heat conducting properties, such that heat from a heating element efficiently is conducted to the melting chamber, in which the work material fed into the melting chamber is melted before being discharged and applied onto a desired area.

A new heating element is also provided, as mentioned above, which can be used for melting a work material in the melting chamber of the head element in a material melting device. Preferably, the heating element is formed with at least one holding element for supporting the head element in the radial direction of the head element, wherein the at least one holding element at least partially surrounds the head element in the peripheral direction of the head element, an, which is resilient in the radial direction of the head element to absorb thermal expansion into the head element. The at least one holding element may have the shape of a loop, and may be formed with a thickness making the loop element resilient.

By loop shaped, is it to be understood that the holding elements are formed with an elongated element comprising a central section having a shape adapted to the outer shape of the head element, to be able to abut and transfer heat to the head element. In each end of the central section the elongated element is bent away from the head element, and given a shape which makes it possible to push out the central section in a resilient way in radial direction of the head element when the heads element is going through a thermal expansion. Preferably, the two parts of the elongated element are bent, on each side of the central section, out from the head element and towards the back such that the two parts of the elongated element are close to each other before the two parts again are bent away from each other. In this way, a loop shaped, resilient holding element is obtained, which can be pushed out in radial direction of an expanding head element, and subsequently return to its original position when the head element is cooled.

The at least one holding element is preferably formed completely or partially from a material having an electric resistance for production of heat in the holding element for melting of the work material. Alternatively, the at least one holding element is formed with a small cross-sectional area such that the electric resistance in the at least one holding element increases. Preferably, the heating element comprises two or more holding elements which are distributed around the head element in the circumferential direction of the head element. Substantially the complete heating element may be made from the same material, and as mentioned, the cross-sectional area of the at least one loop element may be reduced compared to the rest of the heating element for increased electrical resistance ad heat production in the loop element compared to the rest of the heating element.

The heating element is typically made completely, or at least partially, from graphite. If the work material is aluminum, the heating element can typically be put under for example 12V and about 40 Å; however, this must be adapted to the electrical resistance in the heating element. The heat is mainly generated in the thinnest loop formed holding elements. The design of the thin parts is also made with special consideration of thermal expansion of the head element. Graphite also has the advantage of becoming mechanically stronger as it is heated up until about 2500° C. If the head element is made from an electrically conducting material, such as graphite, an electrically isolating sealing between the heating element and the head element must be arranged. This sealing element may for example be made from zirconia. Preferably, the material melting device also comprises at least a heating element support plate abutting the heating element. Preferably, the heating element support plate is formed with a recess or an opening in which one or more flange elements or the like can be arranged, and which contributes to maintain the holding element in place during thermal expansion of the head element.

As mentioned above, the cross-sectional area of the melting chamber, i.e. the cross-sectional area perpendicular to the longitudinal direction of the work material duct and the melting chamber, is larger than the cross-sectional area of the work material duct. Normally, the work material duct and the melting chamber have a substantially circular cross section, and the diameter of the melting chamber may be down to about 1.2 times larger than the cross-sectional area of the work material duct, but preferably the cross-sectional area of the melting chamber is at least 1.5 times larger than the cross-sectional area of the work material duct, depending on several variables, such as the type of work material being used, what type of material the head part is made of and thickness/cross-sectional area of the work material string. Initially, the melting chamber is preferably an empty chamber which typically is 10 mm in height, and has a diameter of typically 5 mm. Here the work material is melted and collected, and in normal operation the chamber will always be full. When the melting chamber is full, a certain over pressure in this melted work material results, because of the feeding of the material wire into the melting chamber. Consequently, melted work material is pushed, or discharged, out from the melting chamber, through a nozzle duct and out of the head element through a nozzle opening. As mentioned above, at the same time melted work material flow up and around the work material string that is being fed into the melting chamber and surrounds the work material string that is being fed into the melting chamber. This results in an efficient heat transfer to the unmelted work material in the melting chamber and makes the melting process more efficient and contributes with this to avoiding the work material is getting stuck and the feeding of the work material to the melting chamber stops. It should also be mentioned that the melting chamber does not necessarily need to have a constant cross-sectional area in the longitudinal direction of the melting chamber, but may for example be conically shaped or be provided with the shape of a droplet in the longitudinal direction of the melting chamber. What is important is that the melting chamber is designed such that melted work material in the melting chamber flows up around work material that is being fed into melting chamber and thereby contributes to a more efficient melting process of the work material in the melting chamber.

Preferably, the cold part comprises a cooling sleeve which at least partially is made from a thermally conducting material, and which is cooled by the cooling element, wherein the cooling sleeve comprises a through-going opening through which the work material duct extends. The cooling sleeve is preferably completely, or at least partially, made from copper; however, it may also be completely or at least partially made from another material which efficiently conduct heat such that an efficient cooling of the work material of the metal wire passing through the work material duct is achieved. The copper has a high heat conducting ability, such that the metal wire remains cold (typically about room temperature). The cooling sleeve is preferably mounted in the cooling element which preferably is arranged with one or more cooling ducts for streaming through a cooling fluid, e.g., water cooling ducts for streaming through of water.

The cooling sleeve, or possibly, the complete cold part, is preferably movable relative the hot part in the longitudinal direction of the material melting device for receiving thermal expansion in the longitudinal direction.

The cooling sleeve, or possibly the complete cold part, is preferably also spring biased from above, such that the cooling sleeve, or possibly, the complete cold part, is pressed against the hot part of the material melting device, such that the complete material melting device becomes tolerant to relative movement of parts of the material melting device which typically, but not necessarily, is caused by thermal expansion. Preferably, the cooling sleeve is arranged in the material melting device in such a way that it abuts the cooling element, and is possibly arranged with a sleeve element and/or a sealing element as described in more detail below.

Further, in the through-going opening of the cooling sleeve, there is preferably arranged a sleeve element extending at least along part of the through-going opening. Then, the work material duct extends through the through-going opening of the sleeve element. Preferably, the sleeve element is made from a material providing low friction between the work material in the work material duct and the sleeve element; for example, the sleeve element may be completely, or at least partially, be made from Teflon®; however, other materials may also be used, if they provide sufficiently low friction between the sleeve element and the work material passing through the work material duct in the sleeve element. It is to be mentioned that when using aluminum as the work material, the sleeve element is at its most important. When the work material is not aluminum, the sleeve element may be omitted, or be made from another suitable material. If suitable, the sleeve element may possibly be comprised from a layer applied on the inside of the through-going opening of the cooling sleeve.

As mentioned above, in the lower part of the through-going opening of the cooling sleeve, there is arranged a sealing element to prevent melted material from flowing up the work material duct. In this case, the work material duct extends through a through-going opening in the sealing element. Preferably, the sealing element is completely, or at least partially, made from graphite. If the through-going opening of the cooling sleeve is arranged with a sealing element, the work material duct will extend through a through-going opening in the sealing element, such that a through-going work material duct is created through the sealing element of the cooling sleeve and possible sleeve element.

Further, the sealing element is preferably formed with a lower end face which can form a wall in the melting chamber, e.g., if the head element is made from graphite and the material melting device is arranged with an isolation element which thermally divides the hot part from the cold part.

If the head element is made from boron nitride, or from a material having similar properties, the head element preferably abuts the sealing element in a contact area. If the melting chamber is arranged having a cross section of inlet which is larger than the cross section of the work material duct, part of the sealing element will in practice function as a small part of the inner wall of the melting chamber.

The contact area preferably has an area that is sufficiently large for the contact area to be self-sealing and leakage of molten work material is avoided. The contact area is a relatively small area offering little possibility for heat exchange between the hot part and the cold part. Normally, the contact area will be the only point of contact between the cold part and the hot part.

In addition to making the contact area so small as possible, the contact area is preferably self sealing, i.e., the size of the contact area is preferably made large enough such that any work material leaking into the contact area will solidify before leaking out from the material melting device. The size of the contact area is therefore decided by it being so large that it is self sealing, but not larger than that in order to minimize the possibility for heat transfer between the hot part and the cold part.

By providing the contact area between the head part of the hot part of the melting device and the sealing element of the cold part of the melting device, a material melting device has been achieved where there is only one contact area between the cold part, where the temperature is kept below the melting temperature of the material at which is being used, and the hot part, where the temperature is kept at least equal to, but preferably above the melting temperature of the work material. It is thereby provided a distinct division between the cold part of the melting device and the hot part of the melting device. This contributes to minimal heat transfer between the hot part and the cold part and that it is avoided that the work material gets stuck in the work material duct.

The sealing element is cooled by the cooling sleeve, and typically maintains about 70° C. in operation; however, this may vary depending on which work material is used in the material melting device. The cooling of the sealing element, which preferably completely or partially is made from graphite, takes place, as mentioned, via the cooling sleeve, because graphite usually contains pores, and thus, cannot be cooled directly by the cooling fluid, which is typically water. When aluminum is used as work material it should be mentioned that the sealing element is most important. When the work material is not aluminum, the sealing element may, depending on the work material used, often be omitted, or possibly be made from another suitable material.

If the sealing element is omitted, the work material duct is constituted by the through-going opening of the cooling sleeve and possibly the through-going opening of the sleeve element if a sleeve element is arranged in the cooling sleeve, such that a work material duct is formed which has a substantially constant and even cross-sectional shape. The function of the sealing element, which still is necessary, is in this case assumed by the cooling sleeve. Possibly, the sealing element may also be made from another suitable material, which is particularly relevant when the work material is not aluminum.

When the sealing element is made from graphite it resists the high temperature at the bottom. If the graphite sealing element is not sufficiently cooled, and melted aluminum gets into the area between the sealing element and the metal wire passing through the work material duct, melted work material may flow into pores in the graphite, and subsequently enough solidified work material may be deposited here to cause rubbing against the metal wire. Typically, the work material is aluminum, and, aluminum rubbing against aluminum has high friction, and this causes the movement of the wire to halt. With this construction, which comprises a sealing element arranged in the cooling sleeve, it is avoided that melted work material gets up into the cold part of the material melting device and, if against all odds this should happen anyway, the melted work material will not flow into the pores of the sealing element, but be pushed out together with the material wire. However, when other materials than aluminum is melted, this might be a relevant situation, and then, the sealing element may be superfluous. For instance, there is very low friction between iron and copper, and, if the work material is iron, the sealing element may possibly be omitted and substituted with copper, which would then be part of the copper of the cooling sleeve.

As mentioned above, the material melting device may possibly comprise at least one isolation element comprising a thermally isolating material. If the material melting device comprises an isolation element, it is preferably arranged between the hot part and the cold part such that the hot part is thermally isolated from the cold part. More specifically, the at least one isolation element will then preferably be arranged such that an inner lateral face of the isolation element forms a wall in the melting chamber. Part of the inner wall of the melting chamber is thus constituted or is formed by the isolation material. The inner lateral face of the isolation element preferably, but not necessarily, has a conical shape. The isolation element may completely, or at least partially, be made from zirconia. Zirconia has a very low heat conducting ability, which is suitable for avoiding heat transfer between the hot part and the cold part of the material melting device.

A typical use of a material melting device as described above is a 3D printer which prints with a metal; i.e., the work material is a metal. In this case, the material melting device will be a metal melting device. Especially, a use of a material melting device as described above where the metal, i.e. the work material, could be aluminum.

Another use of a material melting device as described above is in a soldering device for melting a soldering wire. Also in this case, the material melting device would be a metal melting device.

Further, another typical use of a material melting device, as described above, is in a welding apparatus for melting a filler rod. Also in this case, the material melting device would be a metal melting device.

Further, another typical use of a material melting device, as described above, is in a a glass melting device for melting glass. In this case, the material melting device will be a glass melting device.

With the present invention as described above, several advantages have been achieved. Among other things, the problem with congestion of work material (typically aluminum) is resolved. Aluminum binds to more or less any material being as hard as or harder as aluminum, and, consequently, causes constant congestion or blockage of the feeding of the aluminum wire. Also, solutions have been found which makes it unnecessary with a lot of force in the feeding of the metal wire; i.e., typically an aluminum wire, and that off the shelf stepper motors or servo motors may be used for the feeding of the metal wire.

Further, the problem of leakage of metal is resolved. No wear resistant flexible sealing capable of withstanding temperatures above 700° C. is available. The problem with heat up into the material string, e.g., an aluminum wire, and heat leakage from the hot part to the cold part of the material melting device, is resolved.

The problem of mechanical wear caused by temperature changes, including wear in the heating element and ceramic parts, has also been resolved. Graphite has been selected because, among other things, it becomes stronger at high temperatures. The concomitant problem with thermal expansion (i.e., the difference in expansion between different materials) following temperature changes, has also been resolved.

Further, a general design has been developed, which may be used for far more metals than aluminum and other metals, for example glass. The widespread use of graphite in the material melting device ensures that the construction can withstand metals with most melting temperatures.

In the following, a non-limiting embodiment of a material melting device according to the invention, will be described, wherein.

Figure 1:
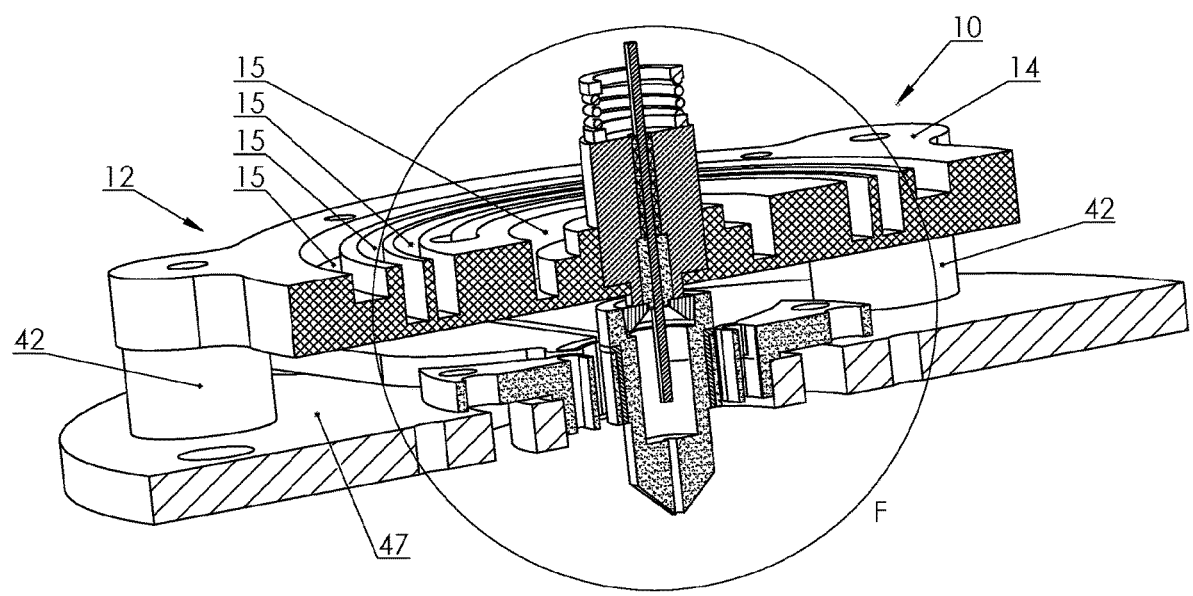
FIG. 1 shows a perspective drawing of an embodiment of the material melting device.
Figure 2:
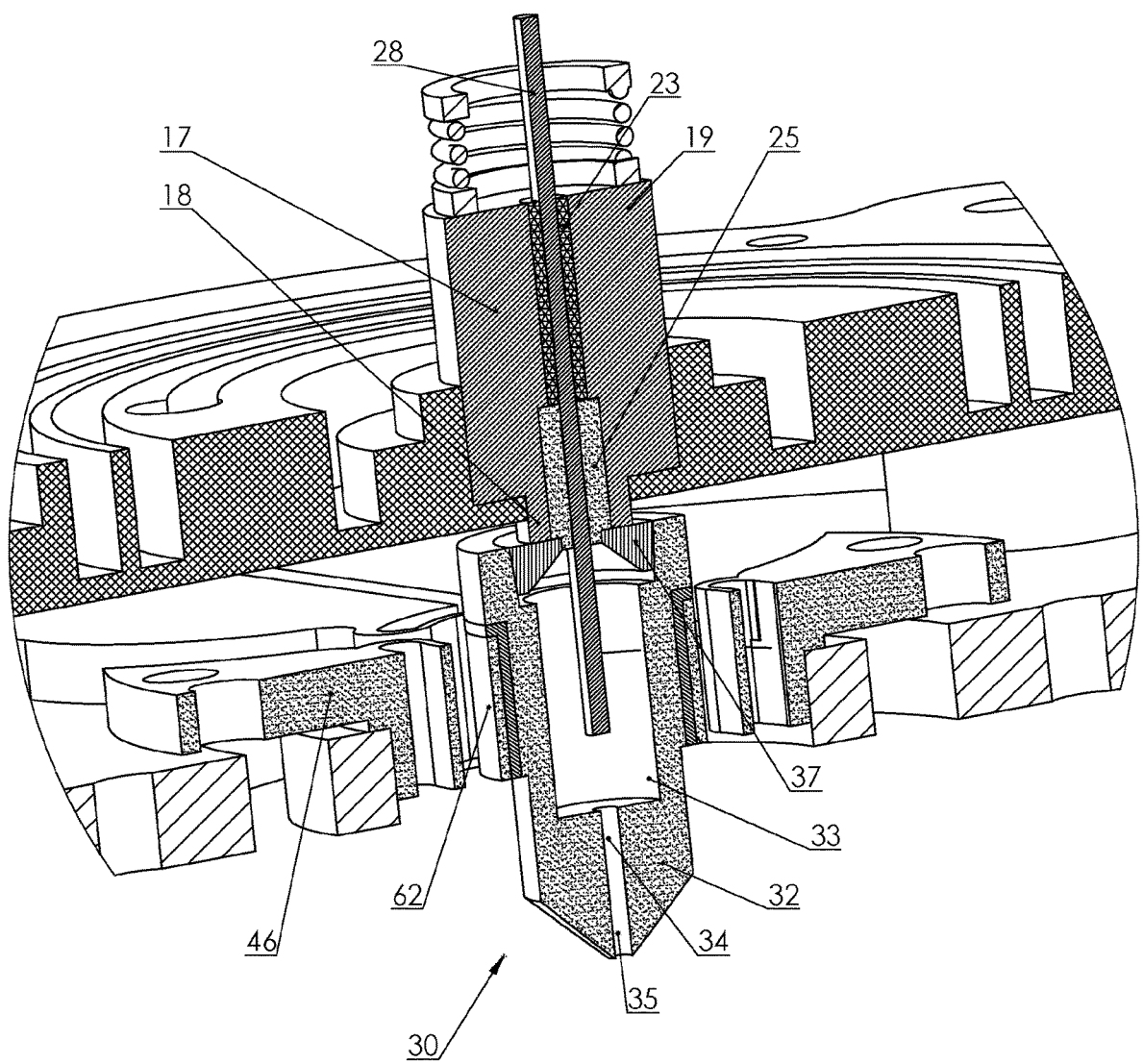
FIG. 2 shows a section F as indicated in FIG. 1 of the material melting device.
Figure 3:
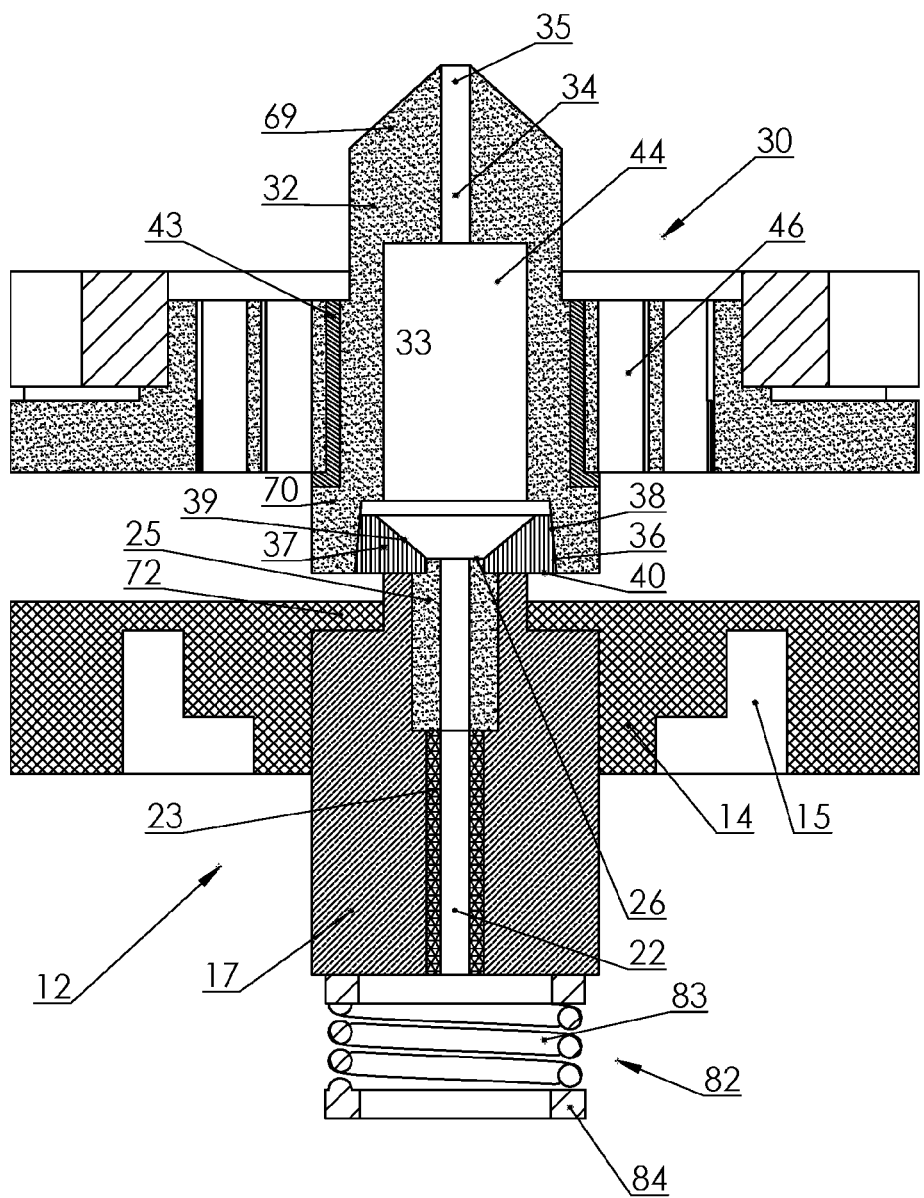
FIG. 3 shows a section of the material melting device in FIGS. 1 and 2.
Figure 4A:
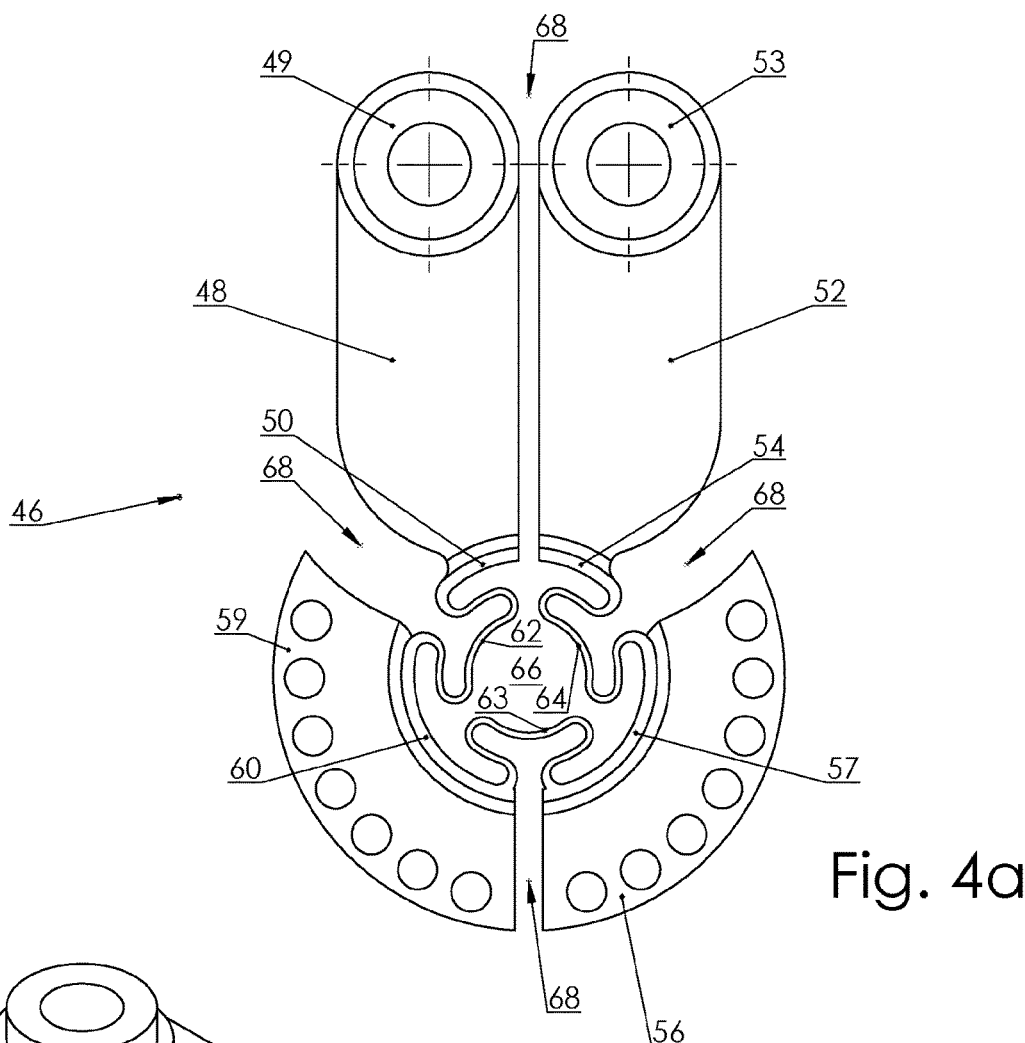
Figure 4B:
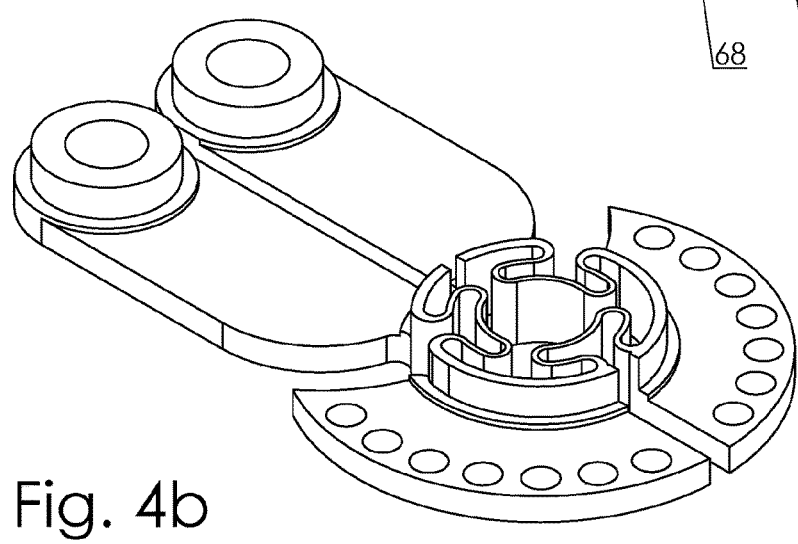

FIGS. 4*a* and 4*b* show a heating element for a material melting device as illustrated in FIGS. 1-3.

Figure 5A:
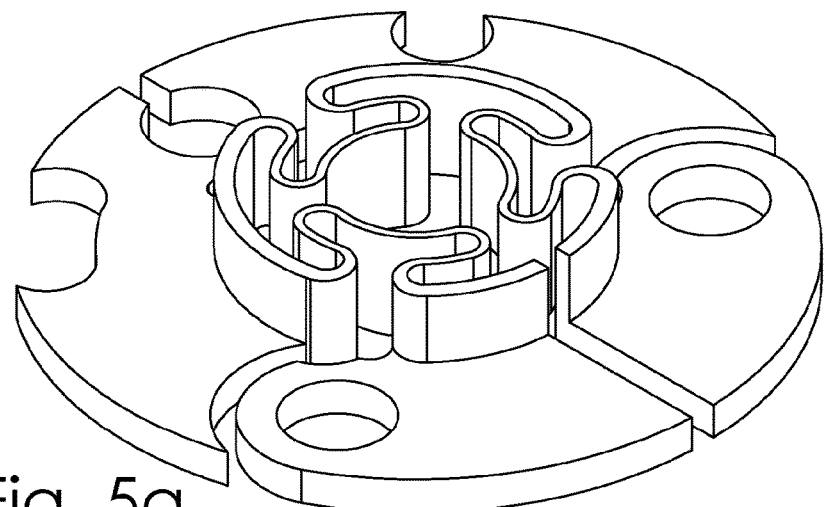
Figure 5B:
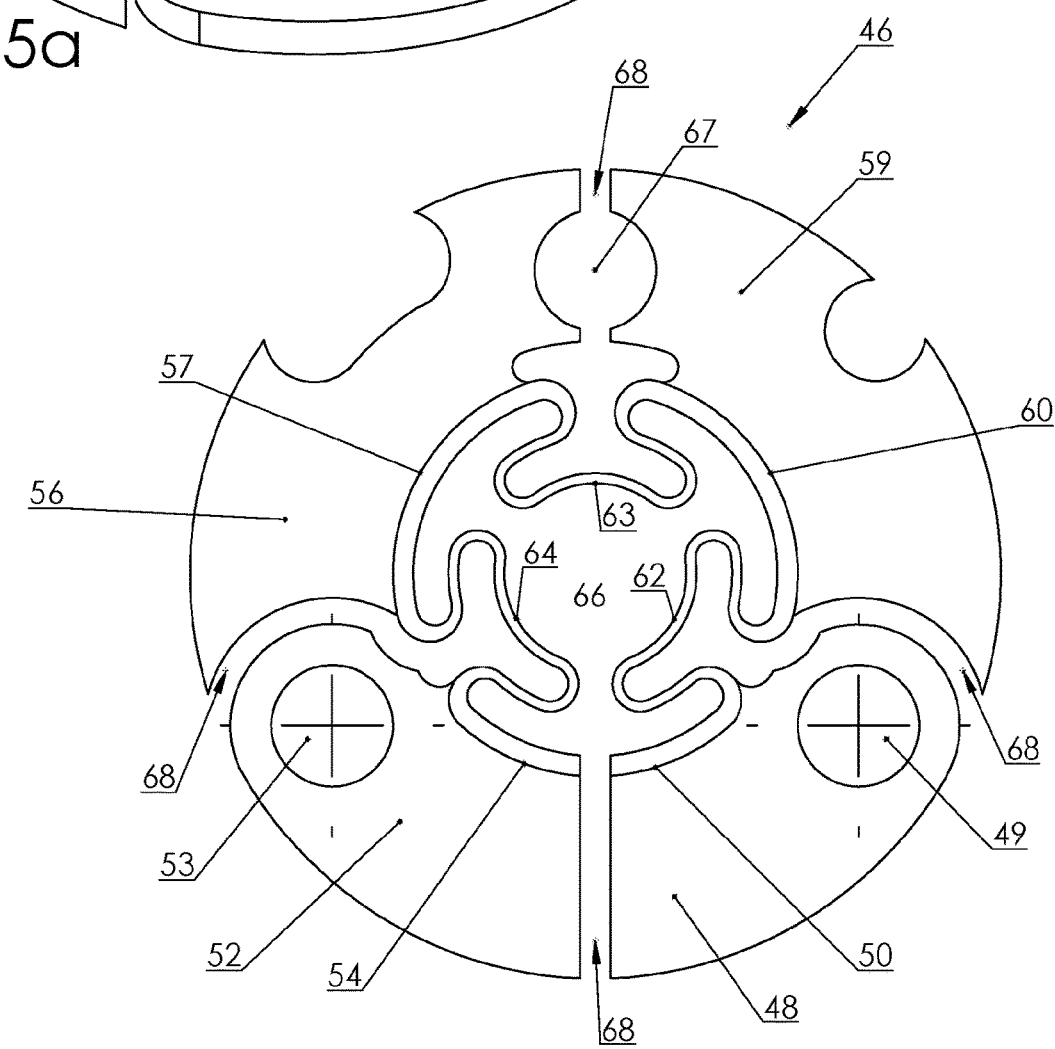

FIGS. 5*a* and 5*b* show a heating element with slightly different design compared to the heating element shown in FIGS. 4*a* and 4*b*.

FIGS. 6*a* and 6*b* show parts of an embodiment of the material melting device in which the heating element in FIGS. 5*a* and 5*b* is included.

Figure 7:
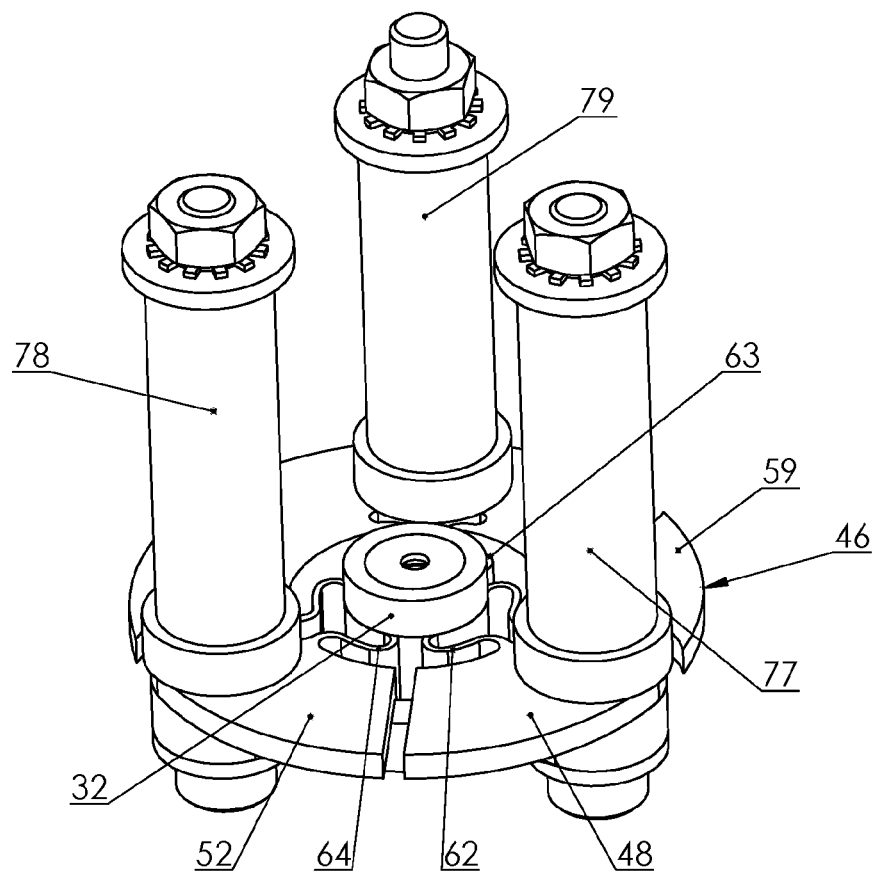

FIG. 7 shows the material melting device with the heating element as shown in FIG. 6 viewed from partially opposite direction.

Figure 8:
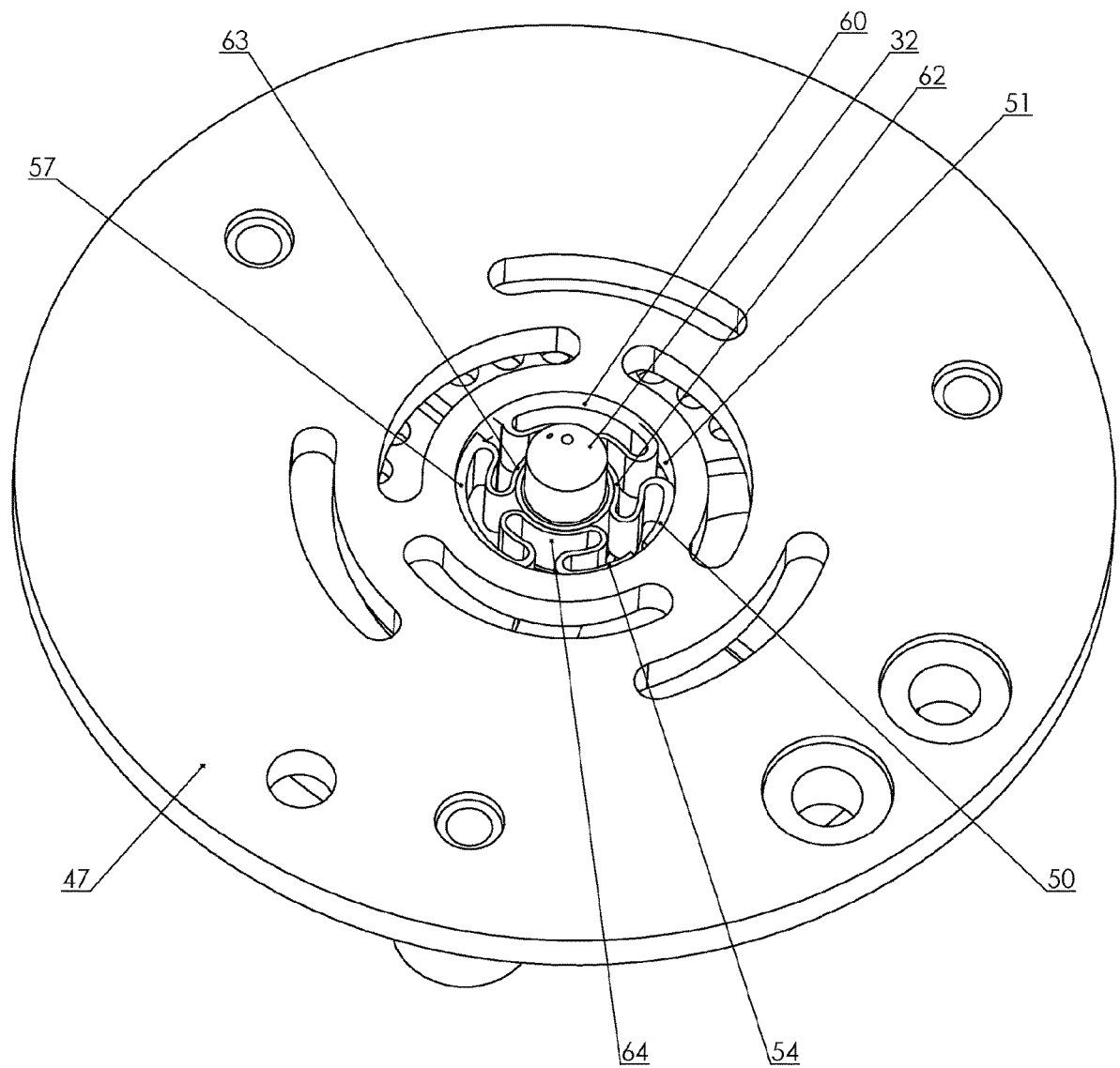

FIG. 8 shows the material melting device with the holding elements of the heating element arranged in an adjusted opening in the heating element support plate.

Figure 9:
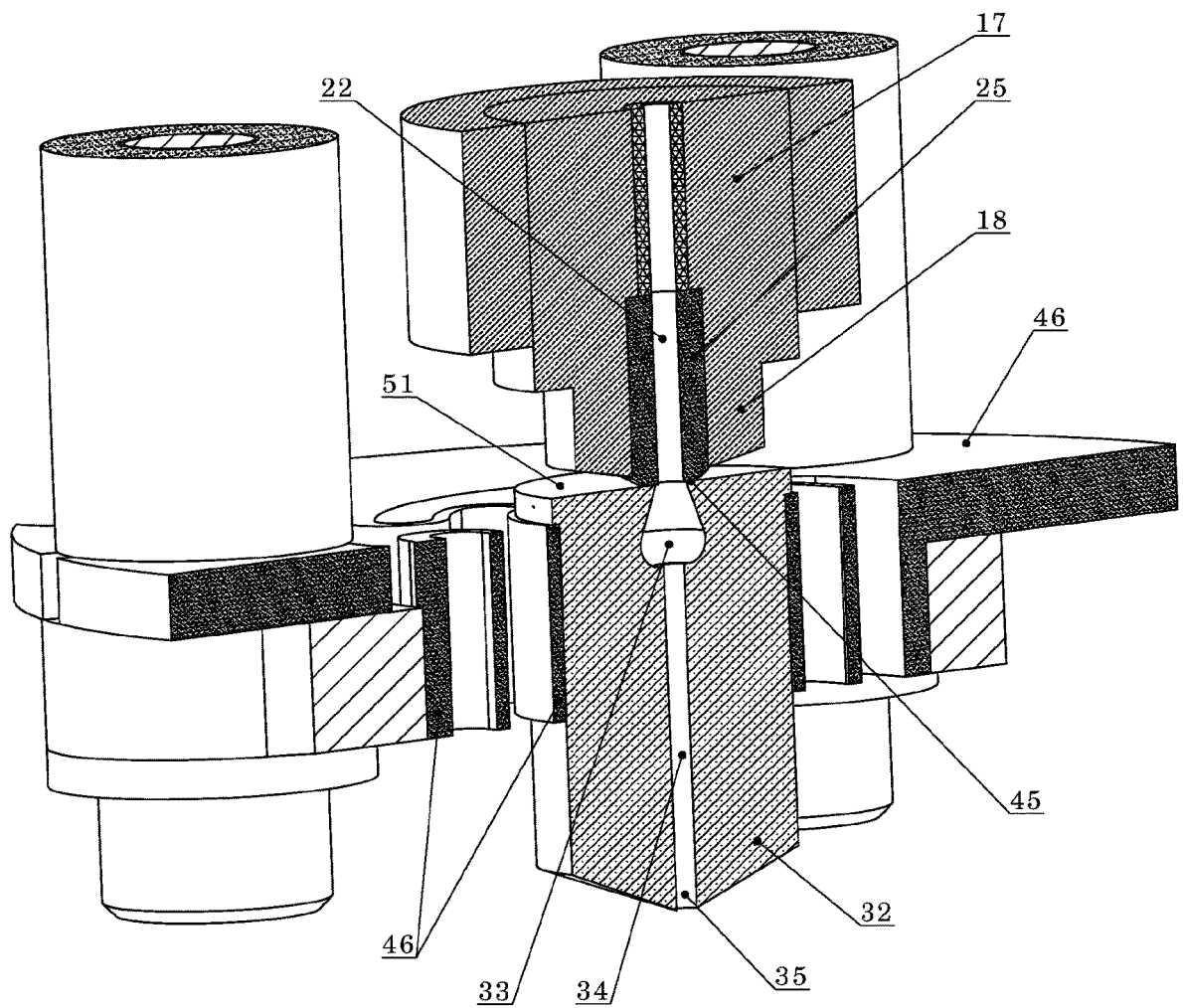

FIG. 9 shows an alternative embodiment of the material melting device without a separate isolation element between the hot and cold part of the material melting device.

It is to be mentioned that corresponding elements in the different figures have the same reference number in all figures. The embodiment of the material melting device shown in FIGS. 1-8, and the embodiment shown in FIG. 9, is to a large degree the same, and the same reference numbers are used for corresponding elements in the two embodiments. It is also to be mentioned that, in order not to flood the figures with reference numbers, only the reference numbers considered to be necessary for understanding the present invention are included in the different figures.

The present material melting device 10 is formed with a cold part 12 and a hot part 30, wherein the supply of material to be melted, which in the following will be called work material, pass through the cold part 12 without melting, and, wherein the material is melted in and discharged from the hot part 30. The cold part 12 and the hot part 30 is thermally separated as much as possible.

Typically, as mentioned above, the work material is a metal, such as aluminum; however, it may also be other materials, e.g., glass.

As indicated in FIGS. 1-3 and in FIG. 9, the cold part 12 comprises a cooling sleeve 17 with a lower end part 18 and an upper end part 19. The cooling sleeve 17 is preferably made from copper; however, the cooling sleeve 17 may also be made from another material which is a good thermal conductor, and which is efficiently cooled. For example, most metals and metallic alloys are good thermal conductors which can be used in the cooling sleeve 17.

In the cooling sleeve 17, there is arranged a through-going opening extending from the upper end part 19 to the lower end part 18, as indicated in the figures. The work material is present in solid form and can be supplied in different forms, for instance as smaller bits or as a wire 28 being fed through the cooling sleeve 17. Necessary feeding equipment adapted to the work material used and the form in which it is supplied is coupled to the through-going opening in the cooling sleeve 17 such that the work material can be fed into and through the cooling sleeve 17. For example, if the work material is a metal wire 28, the feeding equipment can typically comprise a rotatable coil device onto which the metal wire is coiled, and a feeding device which guides the metal wire into the material melting device 10 with a desired force which can be adjustable. Different types of feeding equipment are well-known, commercially available technology, and will consequently not be described here.

In the following, it is assumed that the work material to be melted in the material melting device 10 is in the form of a metal wire 28, as indicated in the figures; however, it is to be understood that the work material may also be in the form of bits or pellets of different sizes. In this case, the feeding equipment will necessarily also be adapted to the form of the work material such that the work material can be fed into the material melting device at desired speed.

Preferably, in the through-going opening in the cooling sleeve 17, it is arranged a layer or a sleeve element 23 extending from the upper end part 19 down towards the lower end part 18; however, the sleeve element 23 preferably does not extend completely through the cooling sleeve 17. The inside of the through-going opening of the cooling sleeve 17 can be coated with a layer of friction reducing material, or, as shown in the figures, a sleeve element may be arranged in the through-going opening.

The sleeve element 23 is arranged with a through-going opening for the material wire 28 being fed into the material melting device 10. Preferably, the sleeve element 23 is made from a material providing reduced friction for the work material, e.g., the metal wire 28 as shown in the figures, in the work material passing through the cooling sleeve. The sleeve element 23 is completely, or at least partially, typically made from Teflon® which is in contact with the work material passing through the cooling sleeve; however, other materials providing desired low friction when the material wire moves through the cooling sleeve 17 may of course also be used. If there is insufficiently low friction between the material wire 28 and the cooling sleeve 17, possibly the sleeve element 23 can be omitted.

In the lower part of the through-going opening of the cooling sleeve 17, there is further arranged a sealing element 25 extending from the sleeve element 23, possibly from the friction reducing layer, and through the through-going opening in the cooling sleeve 17, as shown in the FIGS. 1-3. The sealing element 25 is also formed with a through-going opening which together with the through-going opening in the sleeve element 17 forms a work material duct 22 through the cooling sleeve 17. The primary role of the sealing element 25 is to prevent melted work material from entering the work material duct 22, and, because the sealing element 25 is exposed to melted material, it must be able to withstand high temperatures. Preferably, the sealing element 25 is made from graphite, but other materials able to withstand the temperature of the work material in melted state can also be used. Particularly when the work material is aluminum, it is desired to arrange a sealing element 25 at the lower end of the through-going opening. When the work material is not aluminum, often, the sealing element 25 can be omitted from the through-going opening of the cooling sleeve.

To cool the work material passing through the work material duct 22, the cold part 12 of the material melting device 10 is arranged with a cooling element 14. Preferably, the cooling element 14 surrounds the cooling sleeve 17, and is arranged closely in contact with the cooling sleeve 17, such that a good thermal contact is established between the cooling sleeve and the cooling element, and, consequently, that an efficient cooling of the cooling sleeve 17 is obtained. The cooling element 14 extends along all, or as shown in the figures, along part of, the cooling sleeve 17 in the longitudinal direction of the cooling sleeve. The longitudinal direction of the material melting device 10 and the cooling sleeve is defined as substantially the same direction as the working duct 22 extends through the cooling sleeve 17. The cooling element comprises several cooling ducts 15 through which a cooling fluid can flow. The cooling fluid is preferably water; however, other suitable cooling fluids may of course also be used if desired. There are also other types of cooling fluids available than those using a cooling fluid which is available on the market, and which possibly could be used to cool the work material as it passes through the work material duct 22.

The hot part 30 of the material melting device 10 comprises a head part 32 having a lower end part 69 and an upper end part 70. The head part 32 is formed with a void 44 extending from the upper end part 70 and into the head part 32. The void 44 preferably has, but does not necessarily have, a substantially cylindrical shape. In addition, the upper part of the void 44 preferably has a conical shape with a conical lateral face 36 having tampering diameter down the void 44. The conical lateral face 36 may as indicated in the figures be arranged in an upper part of the void 44 which is placed under the upper part. The head part 32 can be made from graphite; however, other materials having a sufficient thermal conductive ability may of course be used, such that heat can be conducted into the head part 32, and which materials are able to withstand the temperature of the melted work material.

In the upper part of the void 44, in the embodiment that is shown in FIGS. 1-8, there is arranged an isolation element 37 which is annularly shaped, and which is formed with an outer lateral face 38, an inner lateral face 39, and an upper lateral face 40. The isolation element 37 is made from a material which is thermally isolating, e.g., the material zirconia (zirconium dioxide). If desired, other materials having sufficiently low heat conducting ability, and which can withstand the temperature of melted work material, may also be used. The outer lateral face 38 of the isolation element 37 preferably has a conical shape with the same conical shape as the upper lateral face 36 in the upper part of the void 44, such that the isolation element 37 is arranged sealingly in contact with the upper lateral face 36 when placed in the upper part of the void 44.

The upper lateral face 40 of the isolation element 37 faces the cold part 12, and the cold part 12 and the hot part 30 are arranged relative each other such that the cooling sleeve 17 and the sealing element 25 abut the upper lateral face 40. The void 44 in the head part 32, the inner lateral face 39 of the isolation element 37 and the lower end face 26 of the sealing element 25 thus form a melting chamber 33, wherein the work material duct 22 passing through the sealing element 25 empties into the melting chamber 33, in which the material wire 28 is melted. The diameter of the melting chamber 33 is larger than the diameter of the work material duct 22 to make room for melted work material. The cross-sectional area is preferably at least 1.2 times larger than the diameter of work material duct 22, but is more preferred at least 1.5 times or more larger than the diameter of the work material duct 22. Typically, the diameter of the melting chamber can be about 5 times larger than the diameter of the work material duct 22, but this depends on the type of work material and the thermal properties of hot part and the cold part.

As indicated in FIGS. 1-9, the head part 32 further comprises a nozzle duct 34 extending from the melting chamber 33 to a nozzle opening 35 such that melted work material in the melting chamber 33 can be discharged from the melting chamber 33, and the nozzle duct 34. Melted work material in the melting chamber 33 is pressed out of the melting chamber 33, and through, and out of the nozzle duct 34, by the work material being fed into the melting chamber 33 through the work material duct 22 displacing melted work material in the melting chamber 33.

The hot part 30 of the material melting device 10 further comprises a heating element 46 for heating the head part 32, such that the work material in the melting chamber 33 is melted and is maintained liquid in use. Preferably, the heating element 46 functions by comprising a material having sufficient electrical resistance when an electrical current is passed through the material, such that sufficient heat is produced to melt the work material in the melting chamber 33, and keep the work material in the melting chamber 33 and in the nozzle duct 34 liquid as long as the material melting device 10 is in use. Typically, this material is graphite; however, other suitable materials, such as tungsten, may of course also be used. If the head part 32 is made from electrically conducting material, e.g., graphite, and if simultaneously the part of the heating element 46 facing the head part 32 for heating the head part is electrically conductive, there must be arranged a bushing element 43 between the heating element 43 and the head part 32, which at least partially is made from an electrically isolating material, e.g., zirconia (zirconium dioxide).

Other electrically isolating materials can also be used. For example, the bushing element 43 can be made from a ceramic material or another material having good thermal conductivity, and which is also electrically isolating. Such a material may for example be siliconized silicon carbide (SiSiC).

The heating element 46 further comprises one or more expansion compensating elements abutting the head element 32, and which are pressing against the head element 32 with a desired force, which force keeps the head element 32 in place. Because the head element will 32 will be submitted to considerable temperature differences under operation of the material melting device 10, also the head element 32, depending on the material from which the head element 32 is formed, will usually experience a thermal expansion, i.e., an increased size under rising temperature, or decreasing size under falling temperature, which is large enough to the degree that it must be handled in the material melting device 10. The head element 32 will normally experience an expansion both in the longitudinal direction of the head element and in the radial direction of the head element relative the longitudinal direction of the head element, and the expansion in both directions must be received. Consequently, the expansion compensating elements are arranged with faces abutting the head element 32 such at the head element can slide against the surface of the expansion compensating elements when the head element 32 expands in the longitudinal direction of the head element because of rising or falling temperature in the head element. Simultaneously, the expansion compensating elements are arranged such that they are movable in the radial direction of the head element relative the longitudinal direction of the head element, and, at the same time, they maintain the pressure against the head element such that the radial expansion of the head element under rising or falling temperature can be received. The radial motion of the expansion compensating elements can be achieved in several ways, e.g., by employing resilient holding elements, as shown in the figures. Alternatively, the material melting device can comprise several piston/cylinder arrangements arranged around the circumference of the head element, wherein each piston is movably arranged in their respective cylinders, and the piston/cylinder arrangements are arranged such that the cylinders are firmly coupled in the material melting device while the pistons are arranged in their respective cylinder movable in the radial direction of the head element 32. Each piston/cylinder arrangement comprises a holding element which is arranged on the piston such that it abuts the head element 32 the same way as the resilient holding elements shown in the figures. Consequently, the holding elements are movable in radial direction. By maintaining a constant pressure in the cylinders; e.g., by connecting the cylinders to a hydraulic fluid tank and in a common way use valves and one or more pumps for continuously maintain a desired pressure in the cylinders, the respective holding elements of the pistons will abut and press against the head element 32 with a constant force, such that the head element 32 is kept in place both during rising and falling temperature. An alternative solution would be to have cylinders equipped with a gas, such that when the pistons moves out in radial direction during expansion of the head element 32, the gas is compressed and the pressure of the gas increases. When the radial size of the head part 32 decreases, the pressure of the gas will ensure that the piston is pushed out, and continuously abut and supports the head part 32. A further alternative would be to use a number of spring elements arranged around the head element 32 the same way as the piston/cylinder arrangements. One end of the spring elements is firmly mounted in the material melting device. In the other end of the spring elements, holding elements are attached in a similar way as the piston/cylinder arrangements. When the head element expands and contracts following temperature changes, the spring elements will ensure that the holding elements continuously push against and support the head element.

Preferably, both the resilient holding elements and the holding elements of the piston/cylinder arrangements will be made from a material having an electrical resistance providing sufficient heat production when electric current is passed through them to heat the head element 32 to a temperature making the material wire in the melting chamber 33 melt, and such that the melted work material in the melting chamber 33 and the nozzle duct 34 is maintained liquid. This material may for example be graphite; however, other suitable materials may of course also be used. As explained above, a bushing element 43 must be arranged between the head element 32 and the holding elements, the head element 32 of which is made from an electrically conducting material. However, the isolation is not necessary if the head element 32 is designed as part of the electric resistance circuit.

It is also to be mentioned that another possible solution for providing heat energy to melt the work material in the melting chamber 33 could be to use induction heating.

In the embodiments of the heating element 46, as shown in the figures, specifically in FIGS. 4a-4b, and 5a-5b, there is formed a number of plate elements connected to each other such that an electric current can be passed through the plate elements. The embodiments of the heating element 46 shown in the figures comprise four plate elements; a first plate element 48, a second plate element 52, a third plate element 56, and a fourth plate element 59. Of course, fewer or more plate elements can be used if desired. The first plate element 48 is preferably formed with a first flange element 50, the second plate element 52 is preferably formed with a second flange element 54, the third plate element 56 is preferably formed with a third flange element 57, and the fourth plate element 59 is preferably formed with a fourth flange element 60.

The first flange element 50, as shown in FIGS. 4a-4b, and 5a-5b, is connected to the fourth flange element 60 with a first holding element 62 in the form of a resilient holding element formed as a loop, as shown in FIGS. 4a-4b, and 5a-5b. Further, the fourth flange element 60 is connected to the third flange element 57 with a second holding element 63 in the form of a resilient holding element formed as a loop, as shown in FIGS. 4a-4b, and 5a-5b. Moreover, the third flange element 57 is connected to the first flange element 54 with a third holding element 64 in the form of a resilient holding element formed as a loop, as shown in FIGS. 4a-4b, and 5a-5b. Consequently, the four plate elements 48, 52, 56, 59, with respective flange elements 50, 54, 57, 60, are connected to each other, except for the first plate element 48, and the second plate element 52, which are not connected to each other. As shown in FIGS. 4a-4b, and 5a-5b, the four plate elements 48, 52, 56, 59 are connected to each other via the holding elements 62, 63, 64. Beyond this, the plate elements 48, 52, 56, 59 are physically separated with slots 68 between the plate elements, such that all electric current must pass through the holding elements 62, 63, 64.

The first holding element 62, the second holding element 63, and the third holding element 64, as shown in FIGS. 4a-4b, and 5a-5b, form an opening 66, in which the head element 32 is placed such that the holding elements 62, 63, 64 are arranged against the outer surface of the head element 32, possibly with an electrically isolating bushing element 43 between the holding elements 62, 63, 64 and the head element 32, if the head element is made from an electrically conducting material. Thus, the holding elements 62, 63, 64 have a design adapted to the outer shape of the head element. Preferably, the head element 32 have a circular cross section, and, consequently, the holding elements 62, 63, 64 are formed with a curvature adapted to the outer diameter of the head element, preferably such that the holding elements 62, 63, 64 push against the head element 32 with a desired pressure when the head element 32 is placed in the opening 66. Thus, the heating element 46 will contribute to keep the head element 32 in place in the material melting device 10. If the head element 32 is made from an electrically conducting material, the opening 66 must have a slightly larger diameter than the head element, such that there is room for a electrically isolating bushing element 43 between the head element 32 and the holding elements 62, 63, 64, as mentioned above. As already mentioned, the bushing element 43 may for example be made from zirconia.

With the resilient, loop forms holding elements 62, 63, 64, as shown in FIGS. 4a-4b, and 5a-5b, the heating element 46 will be able to receive the radially increasing diameter of the head element 32 during rising temperature as the material melting device is started up. When the temperature later on decreases, and the diameter of the head element 32 also decreases, the resilient loop formed holding elements 62, 63, 64 will return to their initial form and still push against and maintain the head element 32 in its position in the material melting device 10. During heating or cooling of the material melting device 10, it is an advantage when this finds place over a time period long enough to avoid tensions which may cause parts to crack or break.

The plate elements 48, 52, 56, 59, the respective flange elements 50, 54, 57, 60, and the holding elements 62, 63, 64 are preferably formed in one piece. The plate elements 48, 52, 56, 59, the respective flange elements 50, 54, 57, 60, and the holding elements 62, 63, 64 are alternatively formed in separate parts which are mounted together in a suitable way. The plate elements 48, 52, 56, 59, the respective flange elements 50, 54, 57, 60, and the holding elements 62, 63, 64 must be completely, or at least partially, be made from a material which is electrically conducting, such that an electric current can be passed through all the parts, and, at the same time, the material must have an electric resistance which makes it possible to produce enough heat energy to melt the work material in the material wire 28, which is fed into the melting chamber 33, and maintain the melted work material in the melting chamber 33 and the nozzle duct 34 liquid. One material which can be used is graphite; however, other materials with properties as specified above may of course also be used.

The first plate element 48, and the second plate element 52, are arranged with a first connection point 49 and a second connection point 53, respectively, for connecting a source of electric current, and is electrically separated such that an electric current cannot flow from the first plate element 48 to the second plate element 52, or vice versa. Thus, an electric current can be sent from the first connection point 49, through the plate elements 48, 59, 56, 52 (in this order), and to the second connection point 53, or vice versa. The third plate element 56 and the fourth plate element 59 are further arranged with one or more attachment holes 67 for receiving screws, bolts, or the like, such that the heating element 46, in addition to the connection points 49, 53, can also be mounted fixedly in the material melting device in a desired number of the attachment holes 67.

As mentioned in FIGS. 4 and 5, the flange elements 50, 54, 57, 60 are formed with a relatively large cross-sectional area, and thus, an electric current will mainly pass through the flange elements 50, 54, 57, 60, and the holding elements 62, 63, 64. Moreover, the holding elements 62, 63, 64 are preferably formed with a relatively small cross-sectional area relative the flange elements 50, 54, 57, 60, and the plate elements 48 and 52. Because the electric current is forced to pass through the holding elements 62, 63, 64, the largest part of the heat production, due to the electric resistance, will take place in the head elements 62, 63, 64 abutting the head element 32, possibly with an intermediate bushing element 34, as explained above; and, thus, will heat the head part 32. Consequently, the magnitude of heat production desired in the holding elements 62, 63, 64, can be adapted by choosing a cross-sectional area for the holding elements 62, 63, 64 providing desired heat production.

In FIGS. 6a-6b and 7, the material melting device 10 is shown with the head element 62 arranged in the opening 66 (see, FIGS. 4a-4b, and 5a-5b) between the holding elements 62, 63, 64 of the heating element 46. A first support element 77 is mounted in the first connection point 49 of the first plate element 48, and a second support element 78 is mounted in the second connection point 53 of the second plate element 52. In addition, the third support element 79 is mounted in an attachment hole 67 in the third plate element 56, or the fourth plate element 59. Preferably, the third support element 79 is not electrically conducting, and can be made from several different non-conductive, ceramic materials. The first support element 77 and the second support element 78 are arranged with respective electrically conducting elements (not shown in the Figures), For instance, the first support element 77 and the second support element 78 can completely or partially be made from graphite or other suitable electric current conducting materials. By connecting a electric power source (not shown in the Figures) to the electrically conducting elements of the first support element 77 and the second support element 78, an electric current can be sent through the plate elements 48, 59, 56, 52 and the holding elements 62, 63, 64. Thus, in the holding elements 62, 63, 64, heat is produced which will heat the head element 32.

The material melting device 10 can also be arranged with a heating element support plate 47 (see, FIGS. 1, 2, and 8) for supporting the holding elements 62, 63, 64, which may become unstable if they are arranged with a cross-sectional area that is too small to maintain them in a stable position. The heating element support plate 47, as shown in FIG. 8, is preferably formed with an opening 51 in the form of a circular hole in the middle, into which the first, second, third and fourth flange elements 50, 54, 57, 60 fit perfectly. Then, the loop formed first, second, and third holding elements 62, 63, 64 of the heating element 46 is under tension between said hole in the heating element support plate 47, and the head part pushing outwards against first, second, and third holding element 62, 63, 64.

As shown in FIGS. 1-3, the cooling sleeve 17, with the sealing element 25, abuts the isolation element 37 arranged in the upper part of the void 44 in the head element 32. In the Figures, it is suggested that the cooling sleeve 17 is placed in close contact with the isolation element 37; however, the cooling sleeve does not necessarily need to abut the isolation element if the sealing element 25 is sufficiently cooled. However, the sealing element 25 preferably is arranged sealingly abutting the isolation element 37. When the head element 32 expands or contracts in the longitudinal direction of the head element, when the temperature of the head element changes, this will also affect the distance between the head element 32 of the hot part 30 and the cold part 12, because the cooling sleeve 17 is cooled and will not be exposed to thermal expansion or contraction. Consequently, the cooling sleeve 17 is preferably arranged in the cold part 12 moveably in the longitudinal direction of the head element 30 and the material wire 28 relative the cooling element 14. To prevent appearance of an opening between the cooling sleeve 17 with the sealing element 25 and the isolation element 37 such that melted work material leaks out, the material melting device 10 is preferably arranged with one or more pressing devices 82, which is/are arranged such that the pressing device 82 pushes the cooling sleeve 17, and thus the sealing element 25, against the isolation element 37 of the hot part 30. The pressing device 82 may for example be formed with a spring element 83 abutting, preferably slightly pre-tensioned, a spring element support 84 and the cooling sleeve, respectively, as suggested in FIG. 3. When the temperature of the head element 32 increases, and the head element expands, the isolation element 37 of the head element will push the cooling sleeve 17 up against the pressing device 82 such that the spring element 83 is slightly squeezed together. Later, when the temperature decreases, and the head element 32 contracts, the spring element 83 ensures that the cooling sleeve constantly follows the movements of the head element and the isolation element 37. Consequently, the melting chamber 33 will be tight, also during thermal expansion and contraction of the head element 32. One way of keeping the hot part 30 and the cold part 12 together during thermal expansion and contraction of the head element 32 has been shown, wherein one or more spring elements push the cooling sleeve against the head part; however, other suitable mechanisms can be contemplated which have the same function, and, consequently, which can also be used. Such a system can for instance comprise one or more piston/cylinder arrangements mounted to the cold part; i.e., the cooling sleeve 17 and/or the cooling element 14 which push the cold part 12 against the hot part 30 also during thermal expansion and contraction of the head element 32.

During use of the material melting device 10, there might be demand for varying amounts of work material depending on the level of fine details to be made or produced. Depending on the heating demand, there may also be a need for heating elements 46 with different capacities. The material melting device 10 is well suited for varied use since the material melting device easily can be designed such that different parts can be substituted as desired. This is particularly valid for the head element 32, which can be substituted if there is a need for a head element 32 with a smaller or larger melting chamber 33, and/or a nozzle duct 34 with smaller or larger diameter/cross-sectional area. It is also contemplated that one can manufacture substitutable nozzles for the head element 32 to make substitution even simpler. The cooling sleeve 17 with the sealing element 25 and the sleeve element 23 may also be substituted if there is a need for a work material duct 22 having a larger or smaller diameter. The heating element 46 is also substitutable, as mentioned above, if there is a need for a larger change of the heating effect than is possible by regulating the electric current passing through the heating element 46. The cooling element 14 can also be substituted if there is a need for a larger change in the cooling effect than is possible to achieve by regulating the flow of cooling fluid flowing through the cooling ducts 15.

In FIG. 9, there is shown an alternative embodiment of the present material melting device 10, which is mainly similar to the embodiment shown in FIGS. 1-8, which is described in detail above. In connection with the embodiment shown in FIG. 9, only the technical features differentiating the embodiment shown in FIG. 9 from the embodiment shown in FIGS. 1-8 will be described in the following. All other technical features of this embodiment are described in detail above, and will not be repeated here. Those reference numbers used in the description below which cannot be found in FIG. 9 can be found in one or more of FIGS. 1-8.

In the embodiment of the invention shown in FIG. 9, the head part 32 in the hot part 30 of the material melting device 10 is made from boron nitride. This material is electrically isolating, and at the same time it conducts heat. Compared to the embodiment in FIGS. 1-8, the embodiment in FIG. 9 has a head part 32 wherein the isolation element 37 is omitted. This means that it is not necessary to use two parts, i.e., head part 32 and isolation element 37, which have to be made with high tolerance such that they fit closely together to avoid leakage of melted work material in the transition between head part 32 and the isolation element. Also, it is more simple to deal with one single than two parts.

As shown in FIG. 9, the melting chamber 33 is in its entirety arranged in the head element 32 such that the inlet to the melting chamber 33 is placed in a surface 51 on the head element facing the cold part 12, and, specifically against the cooling sleeve 17 and the sealing element 25, or possibly against the cooling element 17 should the sealing element 25 not be included in the material melting device 10.

As shown in FIG. 9, the lower end part of the sealing element 25 abuts the surface 51 on the head element 32 in a common contact area 45. As suggested in FIG. 9, the sealing element 25 is formed such that it projects slightly from the cooling sleeve 17 such that only the sealing element 25 is in contact with the head element 32. The contact area 45 between the head element 32 and the sealing element 25 is preferably made as small as possible to as much as possible prevent heat exchange between the head part 32 and the sealing element 25, and at the same time, large enough such that melted work material possibly leaking out in the contact area solidifies before it can exit.

Because the inlet of the melting chamber 33 is situated in or close to the outlet of the work material duct 22 from the sealing element 25, the work material duct will basically empty into the melting chamber 33. The respective cross sections of the outlet of the work material duct 22 and the inlet of the melting chamber 33 preferably have the same design.

Apart from the inlet of the melting chamber 33, the melting chamber 33 has a cross-sectional area which is larger than the cross-sectional area of the work material duct 22. Normally, both the work material duct 22 and the melting chamber 33 will have substantially circular cross sections, and then the melting chamber 33 will have a diameter which is larger than the diameter of the work material duct 22, except for the inlet of the melting chamber 33 which preferably has substantially the same diameter as the work material duct 22, or possibly somewhat larger than the work material duct 22.

It is to be mentioned that also the melting chamber 33 can be arranged a distance into the inner of the head part 32, and that, in this case, the working duct 22 will extend a distance through the head element 32, from the contact area 45 between the sealing element 22 and the head element 32 to the melting chamber 33.

The melting chamber 33 can have a substantially constant cross section in the longitudinal direction, or it can vary in the longitudinal direction of the melting chamber, as suggested in FIG. 9. However, the cross-sectional area of the melting chamber is preferably larger than the cross-sectional area of the work material duct in the complete length of the melting chamber, except for in the exact place in which the work material duct 22 empties into the melting chamber 33. Even though a non-desired embodiment of the melting chamber 33 may be contemplated, in which the cross-sectional area of the melting chamber 33 is smaller than the cross-sectional area of the work material duct 22, over a certain length of the melting chamber 33 (e.g., with a kind of the number 8 shaped melting chamber having a narrowing in the middle seen in a longitudinal section), at least the volume of the melting chamber would be larger than the volume of a length of the working duct 22 which has the same length as the melting chamber 33.

Because the head element 32 in the embodiment in FIG. 9 is made from boron nitride or another material having similar electrical and thermal properties, i.e., a material having poor electrically conductive ability and good thermally conductive ability, the heating element 46 is arranged in direct contact with the head element 32. This means that the bushing element 43 in the embodiment in FIGS. 1-8 is not necessary in the embodiment in FIG. 9, and is this omitted.

The invention has now been described with reference to a couple of non-limiting embodiments of the invention. An artisan in the field would however understand that the invention, as it is specified above and shown in the Figures, may be modified, and that adjustments may be performed within the scope of the invention as defined in the patent claims.

The invention claimed is:

1. Material melting device for melting a work material and discharge of the melted work material, which material melting device comprises:
    a cold part and a hot part comprising a head part,
    a work material duct for feeding of said work material, which work material duct extends at least partially through the cold part to a melting chamber which is arranged in the hot part,
    wherein the hot part comprises a nozzle duct extending from the melting chamber to a nozzle opening such that melted work material can be flowed from the melting chamber and discharged from the nozzle opening, and which melting chamber has a cross sectional area which is larger than the cross-sectional area of the work material duct, and wherein the cold part comprises a sealing element through which the work material duct extends, the sealing element abutting the head part at a contact area which has an area that is sufficiently large for the contact area to be self-sealing and leakage of molten work material is avoided, wherein the cold part further comprises a cooling sleeve which at least partially is made from a thermally conducting material and which comprises a through-going opening through which the work material duct extends, the cooling sleeve being cooled by a cooling element, and wherein the cooling sleeve is arranged movable relative the cooling element in the longitudinal direction of the material melting device in order to take up thermal expansion of the head part in the same longitudinal direction.

2. Material melting device according to claim 1, wherein the cross-sectional area of the melting chamber is so much larger than the cross-sectional area of the work material duct that melted work material in the melting chamber is capable of flowing around unmelted work material which is being fed into the melting chamber.

3. Material melting device according to claim 1, wherein the cross-sectional area of the melting chamber is at least 1.2 times larger than the cross-sectional area of the work material duct.

4. Material melting device according to claim 1, wherein the work material duct in the cold part empties into the melting chamber in the hot part.

5. Material melting device according to claim 1, wherein the hot part comprises a head part, in that the melting chamber and nozzle duct are arranged in the head part, which head part is heated by a heating element.

6. Material melting device according to claim 1, wherein a sealing element is provided in the through-going opening of the cooling sleeve, and that the work material duct extends through the sealing element.

7. Material melting device according to claim 1, wherein the cooling element comprises one or more cooling ducts for through-flow of a cooling fluid.

8. Material melting device according to claim 1, wherein the cooling sleeve is spring biased such that the cooling sleeve is pressed against the head part.

9. Material melting device according to one of the claims 1-5 or 8
wherein a sleeve element is provided in the through going opening of the cooling sleeve which extends at least along a section of the through going opening, and that the work material duct extends through the sleeve element.

10. Material melting device according to claim 5,
wherein the heating element is formed with at least one holding element for support of the head part in the radial direction of the head part, the at least one holding element at least partially surrounding the head part in the circumferential direction of the head part and being resilient in the radial direction of the head part in order to take up thermal expansion of the head part.

11. Material melting device according to claim 7,
wherein at least one holding element is formed with a material having an electric resistance for production of heat in the at least one holding element for melting of the work material thread in the melting chamber.

12. Material melting device according to claim 5,
wherein the heating element comprises two or more holding elements that are distributed about the head part in the circumferential direction of the head part.

13. Material melting device according to claim 8,
wherein the at least one holding element has a loop form and is formed with a thickness making the loop element resilient in the radial direction of the head part.

14. Material melting device according to claim 8,
wherein the cross-sectional area of the at least one holding element is reduced relative the rest of the heating element for increased electric resistance and heat production in the at least one holding element relative the rest of the heating element.

15. Material melting device according to claim 5,
wherein the heating element is completely, or at least partially, made from graphite.

16. Material melting device according to claim 1,
wherein except for the contact area, there are no points of contact between the cold part and the warm part.

17. Material melting device according to claim 1,
wherein the material melting device comprises at least one insulating element comprising a thermally insulating material, which insulating material is arranged between the hot part and the cold part such that the hot part is thermally isolated from the cold part.

* * * * *